Aug. 4, 1953  C. D. MOORE  2,647,980
PLATEN CONTROL MECHANISM FOR WELDING MACHINES
Filed March 30, 1950
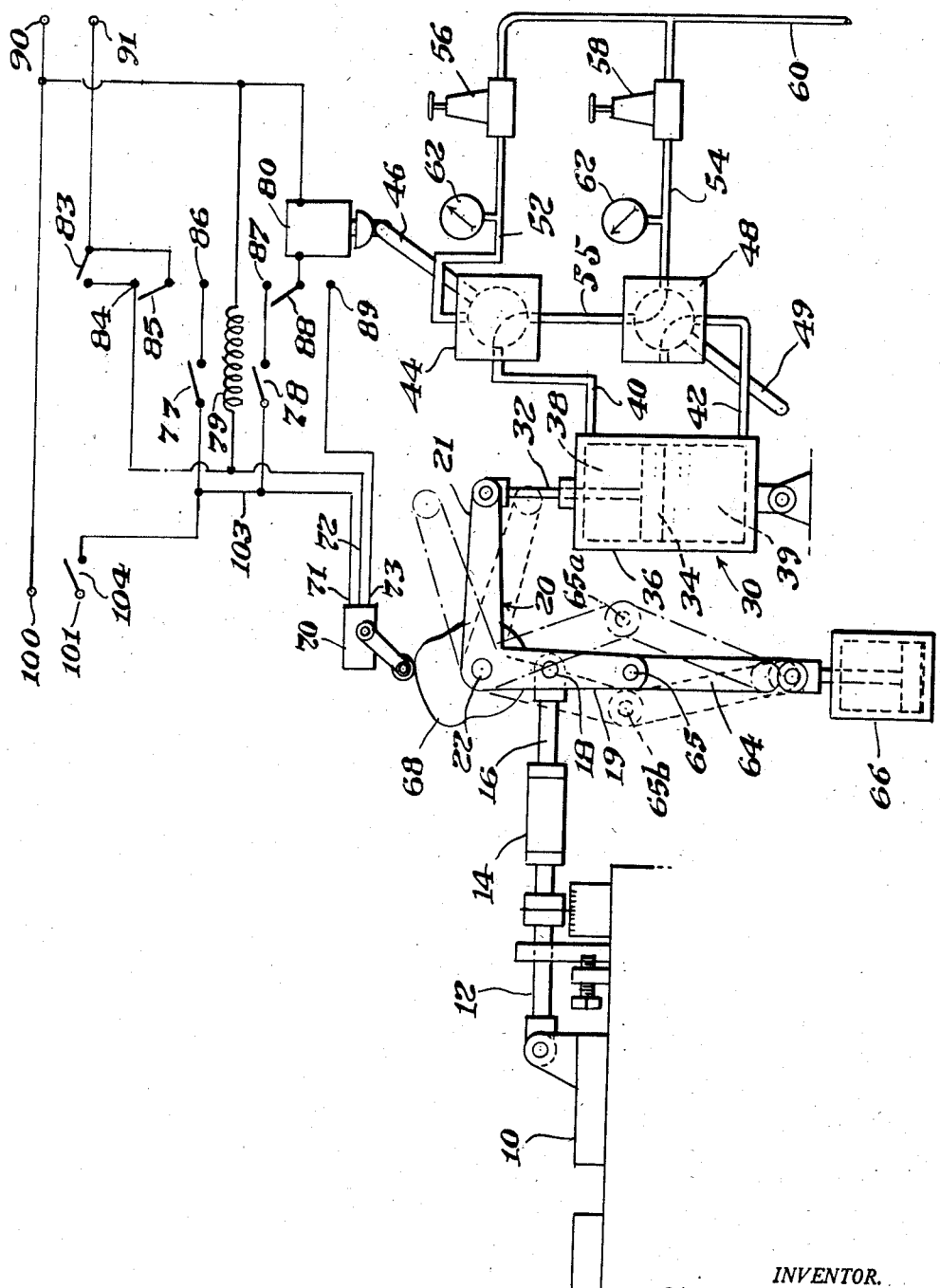
INVENTOR.
CHARLES D. MOORE
BY
Rowland V. Patnick
ATTORNEY

UNITED STATES PATENT OFFICE 2,647,980

PLATEN CONTROL MECHANISM FOR WELDING MACHINES

Charles D. Moore, Malden, Mass., assignor to Thomson Electric Welder Company, Lynn, Mass., a corporation of Massachusetts Application March 30, 1950, Serial No. 152,887

4 Claims. (Cl. 219—4)

This invention relates to welding and specifically to new and improved mechanism for controlling the relative movement of platens of a flash-butt-welding machine.

Conventional platen control mechanisms for such machines provide a relatively slow flash motion followed automatically by a flash-off motion, commonly called the upset, the latter motion being induced by application of a higher forging force. In hydraulically or air-operated machines, these motions are, for example, controlled respectively by initially metering fluid to the motor through a valve and thereafter cutting out the metering valve by by-passing the fluid through a dump valve. Another apparatus is that shown in Stieglitz Patent No. 2,492,200, wherein the slow flash motion is the result of the action of a snubbing device, the snubbing action of which is abruptly terminated at the conclusion of the flash motion to permit abrupt application, as a forging force, of the full force of the theretofore snubbed motor. In these old type machines, adjustment of the metering valve in the one case, or adjustment and/or design of the snubbing device in the other case, permits precise control of the acceleration of the platen during the flashing period and adjustment of the applied fluid pressure permits precise control of the final forging force. With such controls, consistently good welds were secured in the case of most materials and the machines have found wide industrial use.

However, these types of welders, no matter how adjusted, have not been capable of producing consistently good results in the cases of some materials—notably in flash welding copper to aluminum as, for instance, thin wall small copper tubing to aluminum tubing in the refrigerator industry and, as another example, in welding Alclad aluminum alloy wire ends or leaded brass in the wire-drawing industry.

I have now produced a flash-butt-welding machine which can consistently produce uniformly good welds of such materials.

My new machine is based upon my recognition of the utmost importance, in the flash-butt-welding of some materials, including those materials above referred to, of a heretofore unrecognized factor, namely, that the rate of platen travel during the upset caused by application of an optimum final forging force may not be and, in the cases of these materials, is not that rate of platen travel during the upset which will form the best consistently good welds.

Accordingly, I have incorporated an entirely new control in my machine. This control governs the time-distance motion (that is, the speed) of the platen movement during the upset travel entirely independently of the final forging force and can be adjusted. As a result, I may set my machine to have a variety of rates of upset travel with a given final forging pressure, or—what is the same thing—a variety of final forging pressures for a given rate of upset travel.

Such a control is not present in machines typified by the above given two examples of previous machines, wherein the only control of the platen after completion of the flash travel is a control of the final forging force. This force was fixed by adjusting the fluid pressure supplied to the motor; and since the speed of the platen was directly proportional to the amount of force applied and inversely proportional to the mass of the moving parts that were to be accelerated and the friction present, the speed of upsetting travel was wholly determined, and could not be varied from that caused, by a particular adjustment of the final forging pressure—the other factors being constants.

On the contrary, machines of this invention are not, as heretofore, restricted in their rate of platen travel during the upset to a single rate dictated by the final upset pressure setting, but permit utilization of a variety, and hence, the optimum rate of platen travel during the upset for a given, and optimum, setting of final forging pressure, for any given materials or job. Adjustment of rate of travel during upset is thus independent of adjustment of final forging force.

In practice, instead of incorporating new mechanism to control the rate of platen movement during upset, I can, in effect utilize presently incorporated mechanism for adjusting and controlling that rate and incorporate new mechanism to permit adjustment of the final forging force independent of the present mechanism, the function of which has thus been changed.

This approach is shown in the attached drawing wherein, for purposes of illustration only, I have shown a machine embodying an entire system permitting independent adjustable control of (1) rate of platen travel during the flashing period, (2) rate of platen travel during the upset period and (3) final forging pressure exerted on the platen. The control of (1) in this illustrated machine is, in operation, identical with that provided for the same purpose in Stieglitz Patent No. 2,492,200 and has the advantages thereof. The control of (2) in the illustrated machine is a diversion to the purpose of independent control of (2) of the control utilized in the earlier machine to control (3).

New mechanism is therefore herein illustrated and will hereinafter be described, for controlling (3) independently of the control of (2).

Referring to the drawing, which is a diagrammatic view illustrating a preferred form of the apparatus of my invention, the movable platen 10 is connected through rods 12 and 16, a lost motion connection 14, and a pin 18 to one arm 19 of a lever, generally indicated at 20, pivotally mounted at 22 on the frame of the machine. The piston rod 32 of a fluid operated motor, generally indicated at 30, is connected to the other arm 21 of the lever 20 so that any movement of the piston rod 32 of said motor will pivot the lever 20 about pivot 22 and move the platen 10.

The fluid operated motor includes a piston 34 and a cylinder 36, forming a forward chamber 38 and a rear chamber 39. Pipes 40 and 42 may be used interchangeably as fluid supply or exhaust lines, pipe 40 being connected to both a valve 44 operated by lever 46 and to a four-way valve 48 operated by lever 49. Valves 44 and 48 are connected through lines 52 and 54, and independently adjustable reducing valves 56 and 58 respectively to line 60 through which fluid under pressure may be supplied. Lines 52 and 54 may contain fluid pressure gauges 62. Reducing valve 58 is set at a pressure designed to provide initial driving force to motor 30 and constitutes with motor 30 part of a speed-controlling platen-driving mechanism which includes, for the purpose of advancing the platen 10 through an initial flash travel at a slow speed, followed by an upset travel at a faster speed, a toggle mechanism comprising arm 19 of lever 20 attached to link 64 by pin 65 and a snubbing device, generally indicated at 66, interposed between the fluid operated motor 30 and the movable platen 10 which resists the advance of the platen during the initial flash travel, such mechanism being shown in Stieglitz Patent No. 2,492,200. As therein described, the operation of the snubbing device is such that after completion of the flash travel, the upset travel will be induced by the full force of fluid pressure from line 54, as governed by the setting of reducing valve 58.

The speed-controlling platen-driving mechanism of this invention includes also the second fluid inlet line 52 and reducing valve 56, set at a higher pressure than valve 58, and designed to apply an adjustable final forging force to the motor 30. This line is opened to the motor 30 in timed relation with the current cut-off to the welding transformer terminals 90 and 91 as will now be described.

A control mechanism including a switch 70 actuated by a cam 68 mounted on lever 20 is provided whereby the current supplied to the welding transformer terminals 90 and 91 may be cut off at a fixed point of platen advance. Solenoid 80 is also actuated by this switch 70 to operate valve 44 through lever 46 to supply high pressure fluid from line 52 for applying the final forging force. To permit operation of valve 44 either before or after the current in the welding transformer is cut off, time delay switches 77 and 78 and their controlling coil 79 associated with selector switches 83, 85 and 88 are provided.

Current may be supplied by any suitable means to terminals 100 and 101 of the control circuit, a switch or circuit breaker 104 being provided in series relation with terminal 101 to permit cutting off the current independently of the switch 70. The common terminal 71 of switch 70 is attached to terminal 101, through switch 104 by wire 103. Switch 83 is connected to the normally closed terminal 72 of switch 70, switch 83 being arranged to break the current to the welding transformer terminals 90 and 91 when switches 85 and 88 are in open position. Switches 85 and 88 are arranged to permit operation of solenoid 80 at an adjustable time interval, either before or after the current to the welding transformer terminals 90 and 91 is cut off, switch 85 being arranged to permit the welding transformer terminal 91 to be connected either directly to the normally closed terminal 72 of switch 70 or to wire 103 through the normally open time delay relay switch 77, and switch 87 being arranged to permit the solenoid 80 to be connected either to the normally open terminal 73 of switch 70 or to the normally closed time delay relay switch 78. A common time delay relay coil 79 is provided to operate time delay switches 77 and 78, said coil being connected to the normally closed terminal 72 of switch 70, so that when said terminal 72 is opened to cut off the current through said coil 79, the time delay switches 77 and 78 will delay for the desired length of time before returning to their normal position. Switches 77 and 78 are preferably of a type which will permit adjustment of the amount of time delay.

In operation, at the beginning of the flash-off period, the toggle mechanism is in its most rearward position as indicated by the position of pin 65 at 65a. Valves 44 and 48 are moved to connect forward chamber 38 of motor 30 to the source of relatively low pressure fluid from line 54 and rear chamber 39 to an exhaust opening, line 40 being connected to line 55 and line 42 to an exhaust opening by valve 48. Valve 44 is arranged to prevent fluid flow either into or from line 52. Reducing valve 58 connecting line 54 to line 60 and to a supply of fluid pressure, is adjusted to provide the desired rate of upset platen travel. At the same time, closing of switch 104 supplies current to the welding transformer. The platen 10 then is moved forward at relatively slow speed under the control of the snubbing device 66 until the toggle assumes the dead center position, illustrated by the position of pin 65. The snubbing device then becomes inoperative and the platen begins its subsequent upset travel at a faster speed since it is unrestrained by the snubbing mechanism. The cam 68 is arranged to contact switch 70 during said upset motion, the switch 70 preferably being adjustable with relation to said cam 68 to permit actuation of the control mechanism at any desired point during the travel of movable platen 10.

The control mechanism provided permits the operator to select independently of the above described platen speed control mechanism by means of switches 83, 85 and 88, the proper final forging force for the material to be welded in timed relation with the platen travel at a position beyond that at the initiation of the upset travel. If the desired rate of upset travel, as determined by the setting of reducing valve 58, will provide the desired final forging force, switch 83 is closed and switches 85 and 88 are opened. The actuating of switch 70 by cam 68 will then turn off the current to the welding transformer terminals 90 and 91 without actuating solenoid 80 to operate valve 44. The length of time which elapses between the initiation of the upset travel and the actuating of the control mechanism may be determined by adjusting switch 70 and cam 68 relatively to one another, so that switch 70 may be actuated at any desired point in the platen travel.

If it is desired to apply a final forging force greater than that which would be supplied by the pressure of fluid determined by the setting of reducing valve 58, switch 83 is left open and switches 85 and 88 closed. The actuating of switch 70 will then operate the solenoid 80 and valve 44 to connect line 40 to line 52, which is supplied with fluid at any desired higher pressure than that in line 54, by adjustment of the reducing valve 56 interposed between line 52 and line 60. Suitable pressures, by way of example, are 30 pounds per square inch supplied by the lower pressure line 54, and 70 to 80 pounds per square inch supplied by the high pressure line 52. For such pressures, a fluid supply pressure of 80 pounds per square inch in line 60 will be sufficient.

The final forging force may be applied either before or after the current to the welding transformer is cut off by means of switches 85 and 88. If it is desired to apply the final forging force after the current to the welding transformer is cut off, switches 85 and 88 are connected to terminals 84 and 87 respectively. The actuation of switch 70 by cam 68 then immediately cuts off the current to the welding transformer terminals 90 and 91 and to the time delay relay coil 79. Time delay relay switch 78 will then close after its set time interval and permit current to flow through solenoid 80 and thus cause it to operate valve 44 to connect the forward chamber 38 of motor 30 to line 52 of higher fluid pressure. The fluid motor will then apply a greater force for the final forging. The amount of delay of delay switch 78 may be adjusted as hereinbefore described to any desired interval.

If it is desired to apply the final forging force before the current to the welding transformer is cut off, switches 85 and 88 are connected to terminals 86 and 89 respectively. When switch 70 is operated by cam 68, current is supplied immediately to solenoid 80 and valve 44 is actuated to supply higher pressure fluid to fluid motor 30. The current is also cut off in relay coil 79, thus opening relay switch 77 after a set interval of time and cutting off the current to the welding transformer terminals 90 and 91. The amount of delay may be varied by adjusting delay switch 77.

The rate and acceleration of platen travel during flash travel, controlled by the snubbing device, is at a relatively slow speed and will be substantially the same for various fluid pressures supplied to motor 30 from line 54 for a given setting of the snubbing device. The subsequent platen upset travel to produce a faster speed is determined by the particular pressure supplied to motor 30 after the snubbing device ceases to be effective. According to the present invention, any desired final forging pressure may be applied from line 52 in timed relation with the platen travel at a position of the platen travel beyond its position at the initiation of the upset travel. For instance, the same final forging pressure may be applied with any of a variety of upset travel rates or indeed, any desired final forging force may be applied after any desired upset travel rate. Thus, it will be seen that the mechanism herein illustrated and described permits the adjustable control of (3) final forging pressure exerted on the platen independently of (2) rate of platen travel during the upset period, as hereinbefore pointed out.

After the weld has been completed as shown by the position of the toggle mechanism corresponding to the position of the pin 65 at 65b, switch 104 is opened and the work taken out of the machine in the usual way. The opening of switch 104 also cuts off the current in the solenoid 80, thus returning the valve 44 to its initial position. The platen 10 may then be returned to the position for the beginning of another welding cycle by operating valve 48 by means of handle 49 to connect line 42 to line 54 and the source of a lower fluid pressure through reducing valve 58 and line 60. At the same time, valve 48 connects line 55 to an exhaust opening in said valve. The fluid pressure in rear chamber 39 of motor 30 will then move said motor pivoting the toggle mechanism to the position corresponding to toggle pin 65 at 65a and moving platen 10 rearwardly to the position for the beginning of a new welding cycle.

The welding results accomplished by this mechanism have enabled the welding of materials that have formerly been difficult or impossible to weld on automatic machinery, and the use of such mechanism offers a highly reliable automatic welding cycle for such materials.

I claim:

1. In a flash butt welder having a movable platen, platen controlling mechanism including means for advancing said platen through an initial flash travel at a variable predetermined speed, means for thereafter applying a variable predetermined force to said platen to cause said platen to further advance through an upset travel at a variable relatively faster speed induced by said force, and means variable independently of said two aforesaid means for applying a still greater variable predetermined force to said platen after said platen has moved beyond its position at the initiation of said upset travel, whereby the final applied force may be varied independently of the upset travel speed caused by application of a selected upset force.

2. A flash butt welder as claimed in claim 1 further characterized in that said controlling mechanism comprises a fluid motor connected to said platen for driving said platen through said flash and upset travels, and separate fluid inlet lines to said motor for applying fluid to said motor through one line at an upset travel pressure for applying to said platen through said motor said upset travel force and through the other line at a subsequent relative higher pressure for applying to said platen through said motor said still greater force.

3. A flash butt welder as claimed in claim 2 further characterized in that at least one of said inlet lines has a pressure regulating valve for adjusting the pressure of fluid applied to said motor through said one line.

4. A flash butt welder as claimed in claim 2 further characterized in that each of said fluid inlet lines has a pressure regulating valve for adjusting independently the pressure applied to said motor through each of said lines.

CHARLES D. MOORE.

References Cited in the file of this patent

UNITED STATES PATENTS

| Number | Name | Date |
| --- | --- | --- |
| 1,848,271 | Phelps | Mar. 8, 1932 |
| 1,892,208 | Ferris et al. | Dec. 27, 1932 |
| 1,957,759 | Coates et al. | May 8, 1934 |
| 2,359,324 | Marcaux | Oct. 3, 1944 |
| 2,492,200 | Stieglitz | Dec. 27, 1949 |

FOREIGN PATENTS

| Number | Country | Date |
| --- | --- | --- |
| 280,659 | Great Britain | Nov. 24, 1927 |
| 283,630 | Great Britain | Jan. 11, 1928 |